May 18, 1954  M. D. BEEM ET AL  2,678,452
HOSPITAL BED
Filed Dec. 12, 1950  12 Sheets-Sheet 1
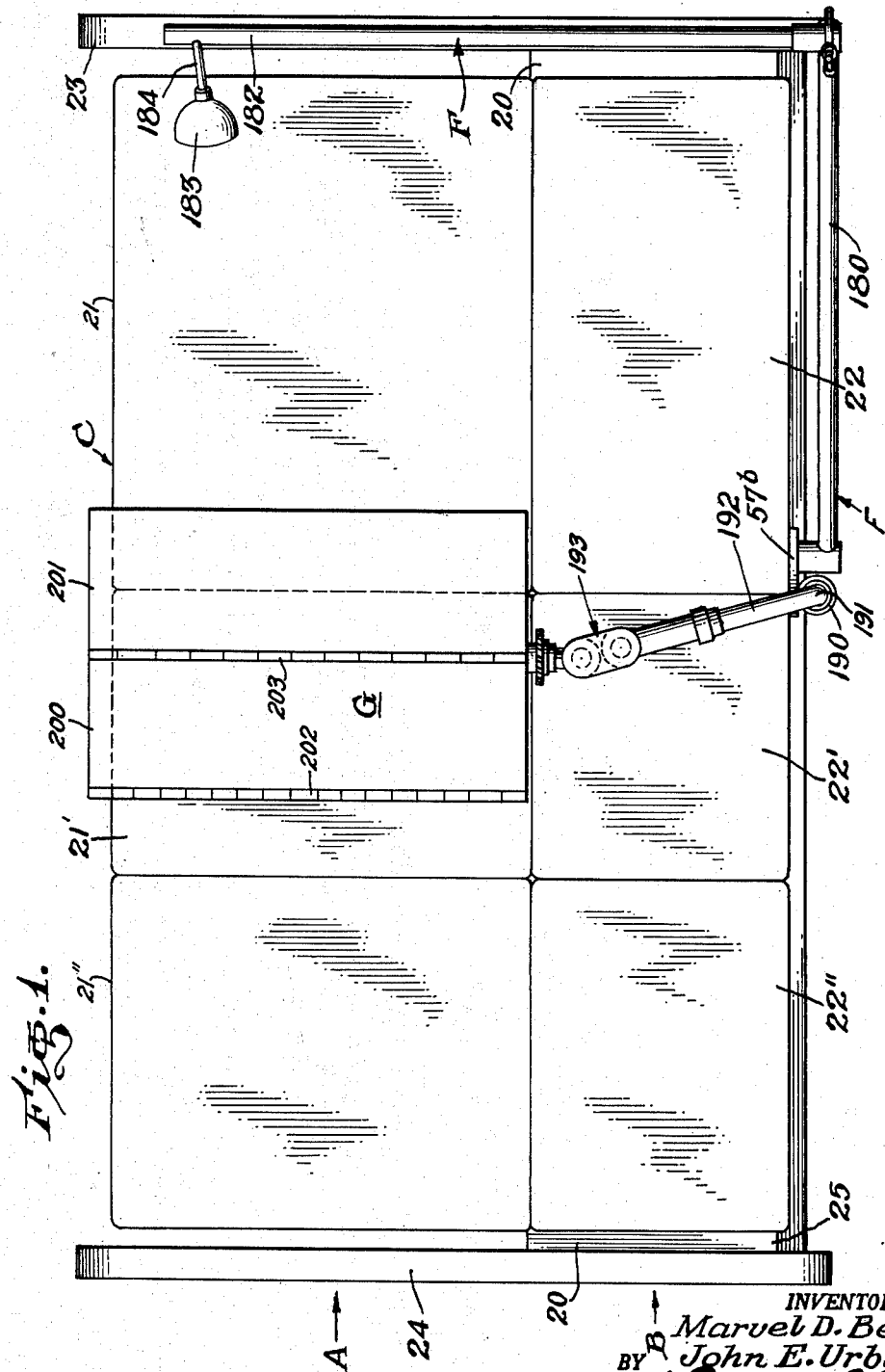
INVENTORS
Marvel D. Beem,
BY John E. Urbany.
Lynn A. Latta
Attorney.

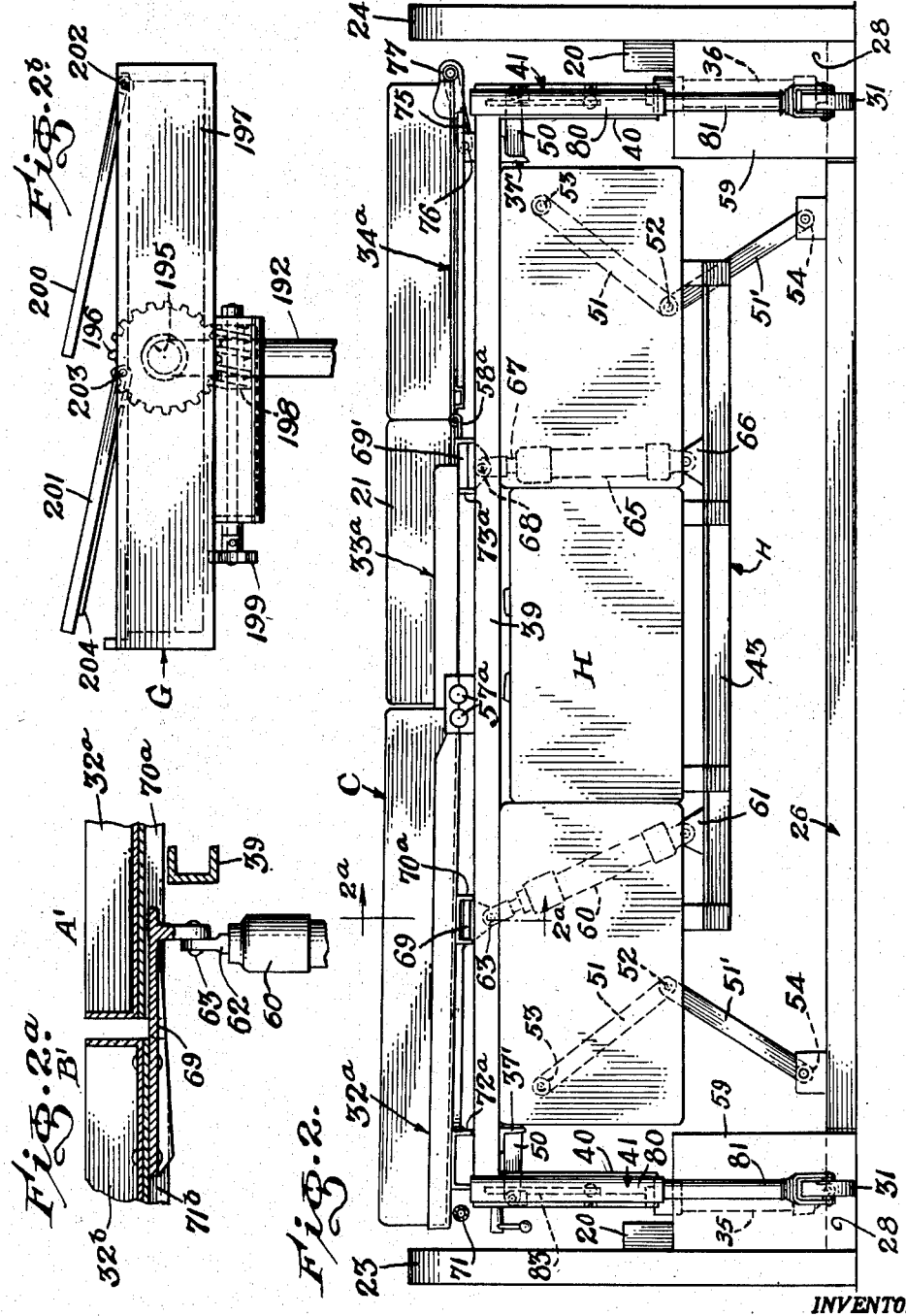

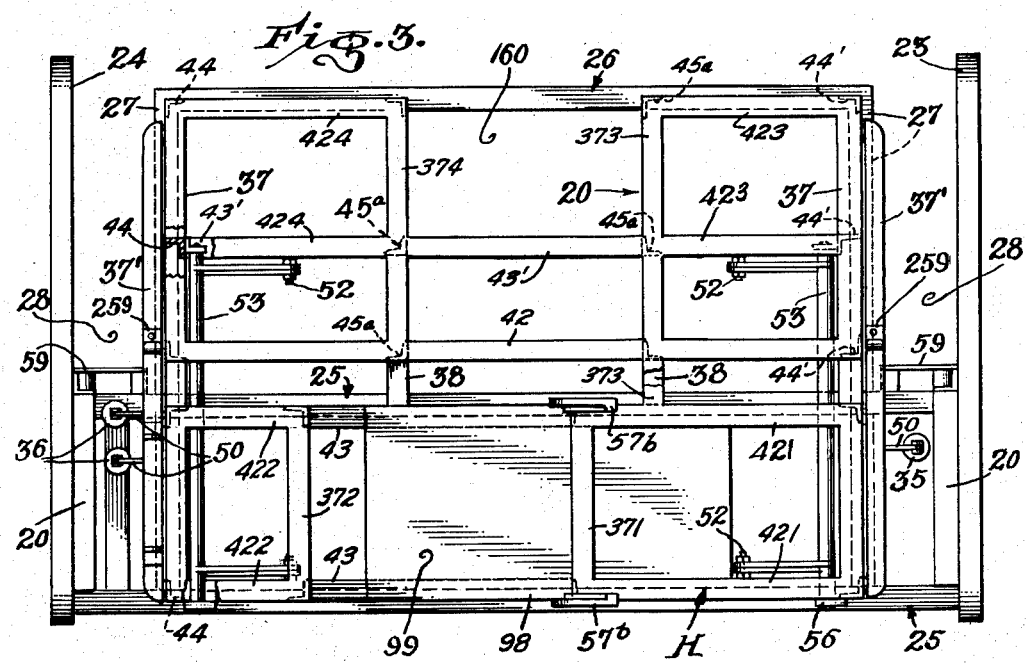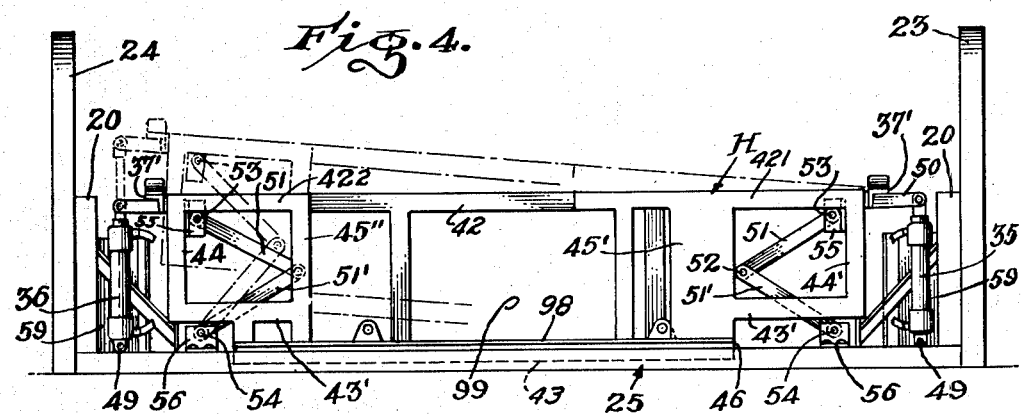

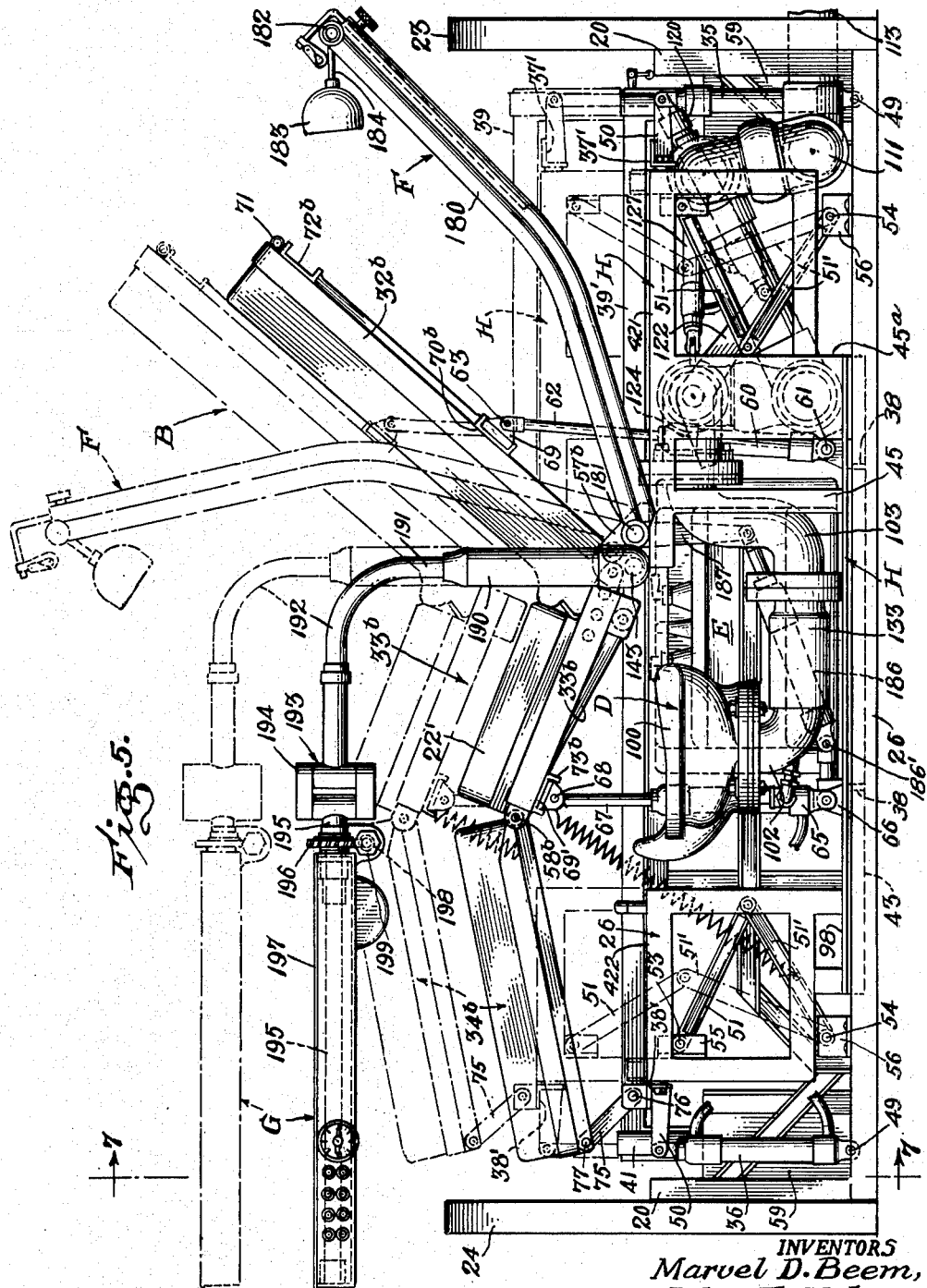

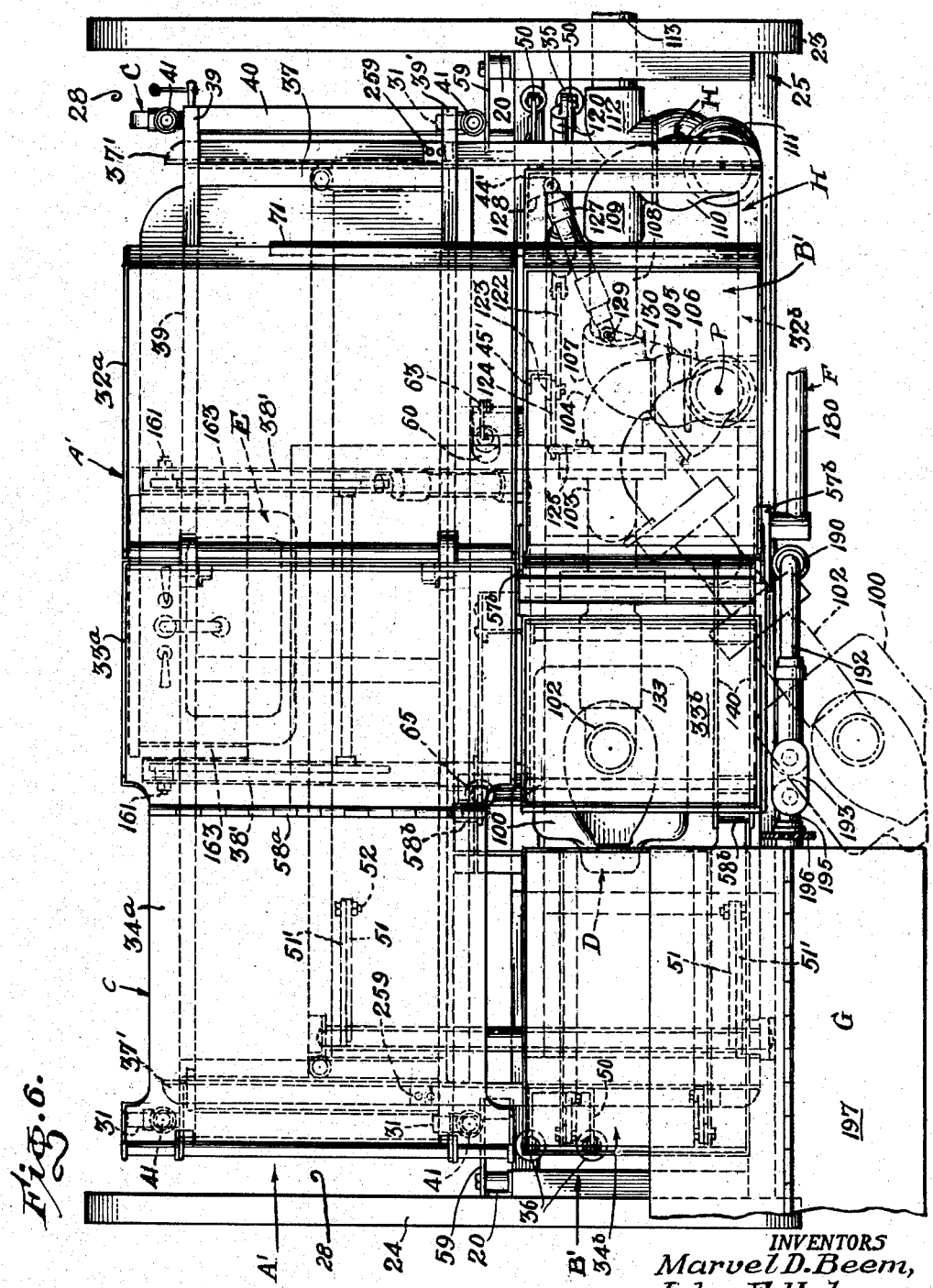

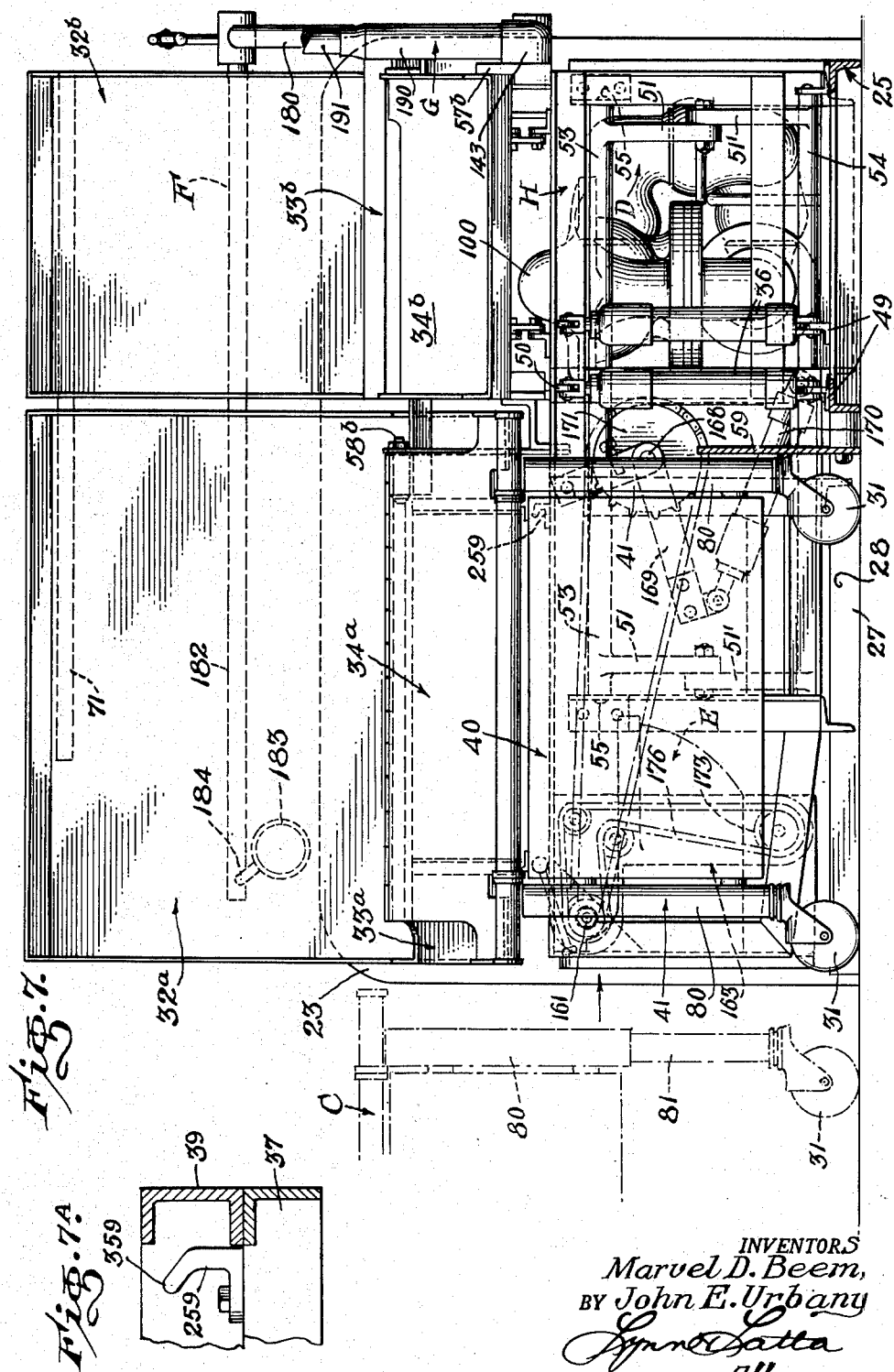

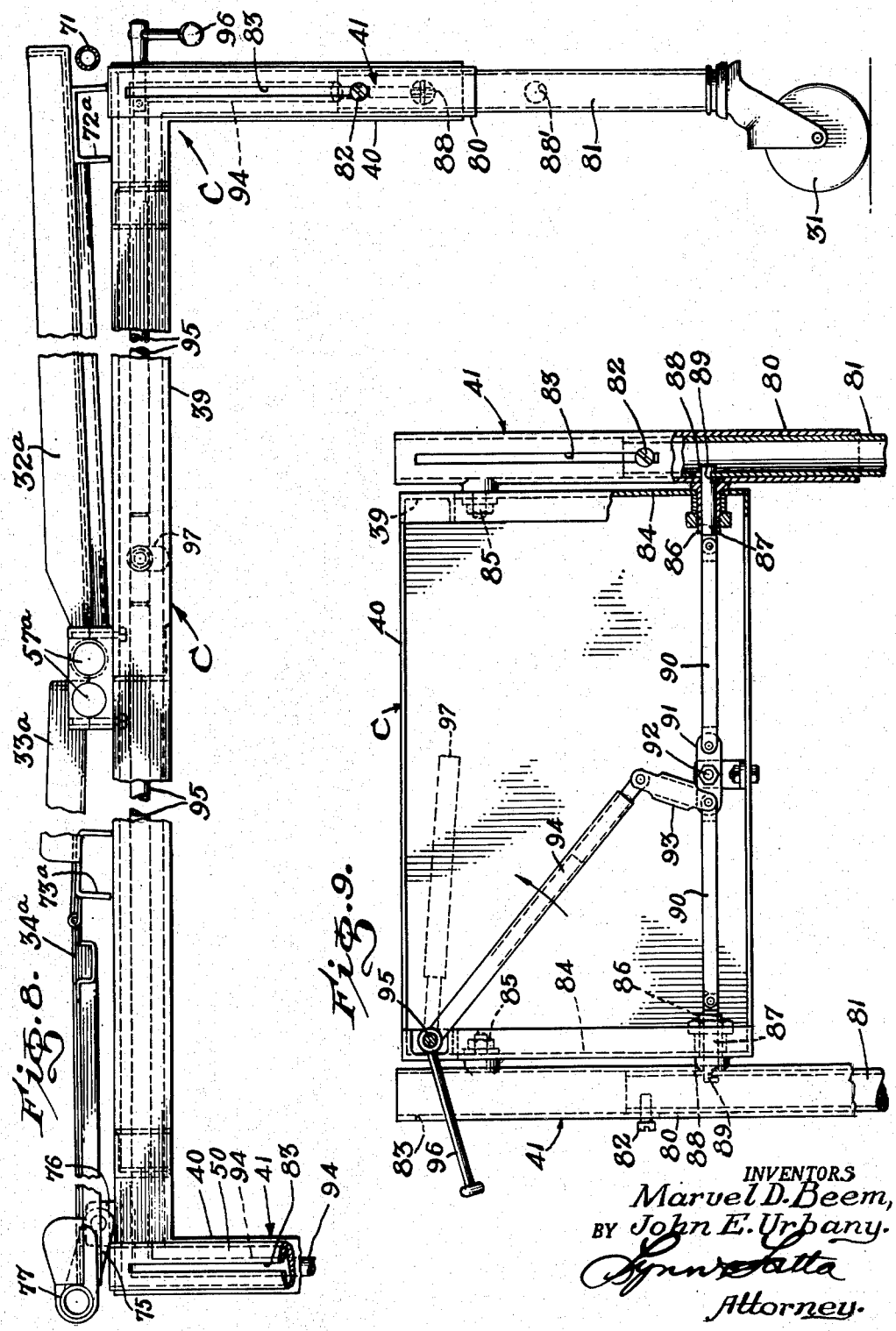

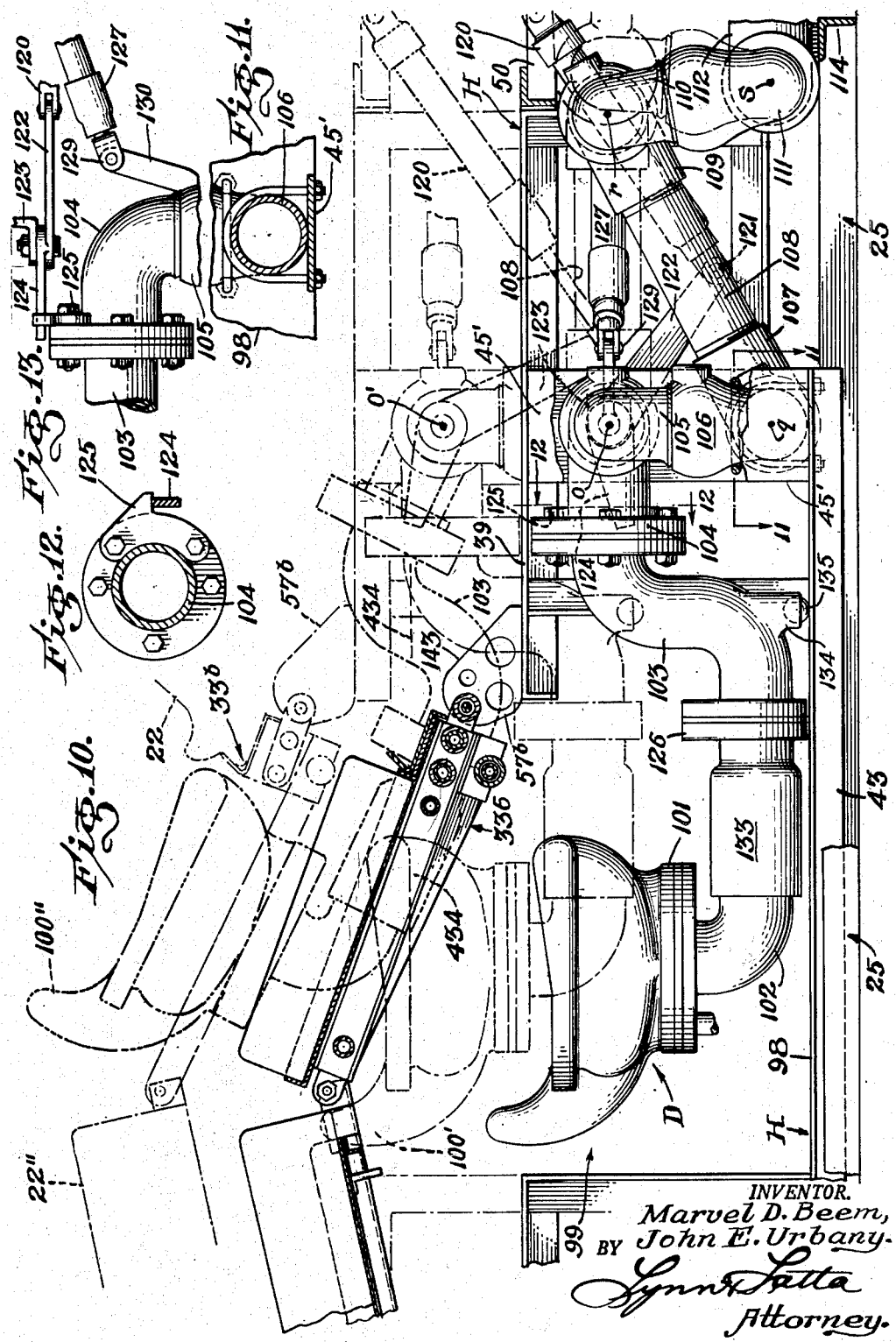

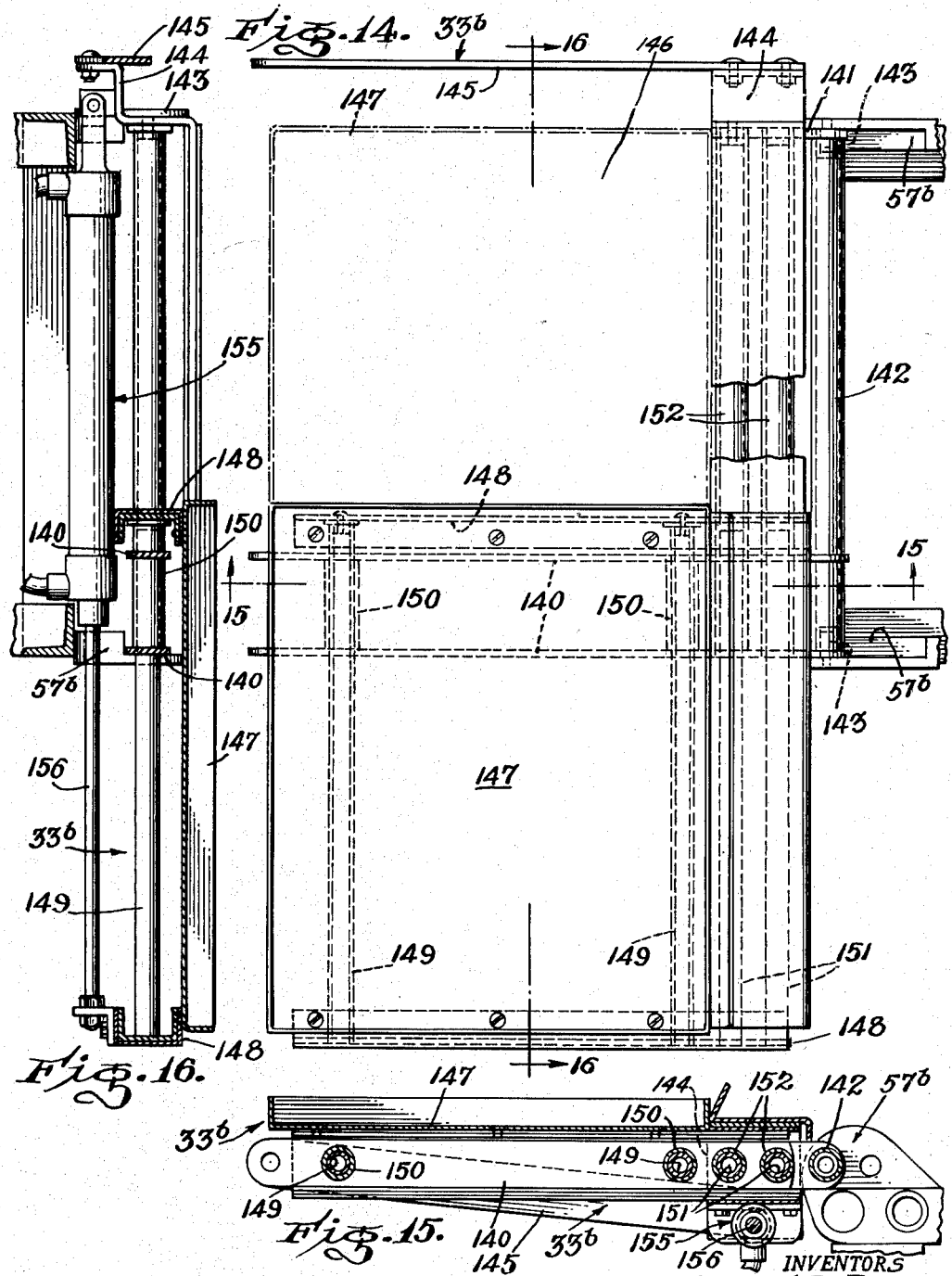

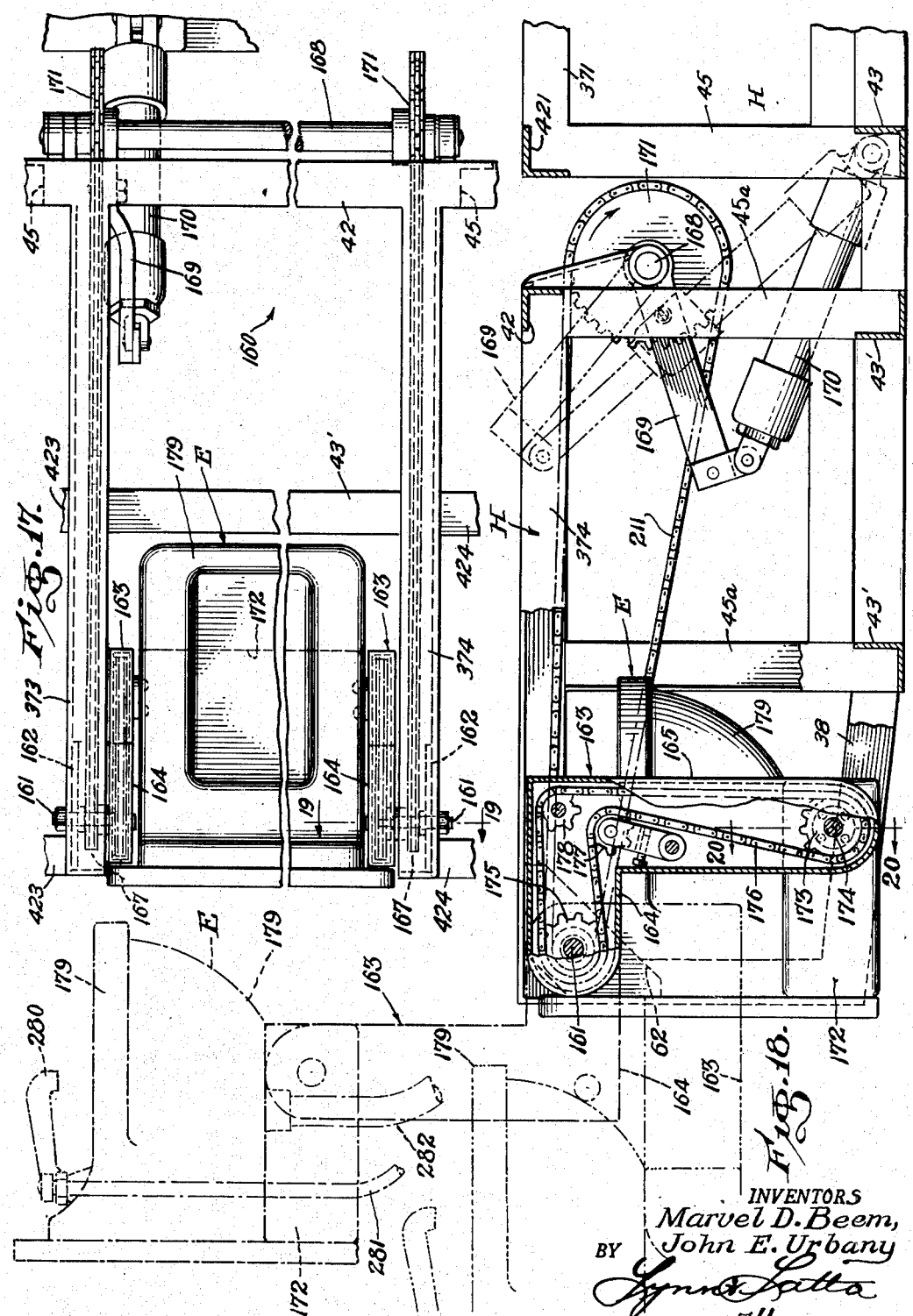

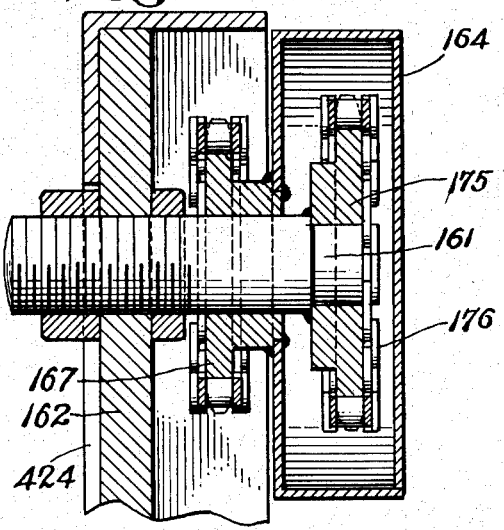
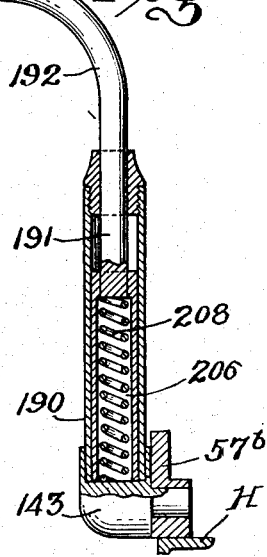
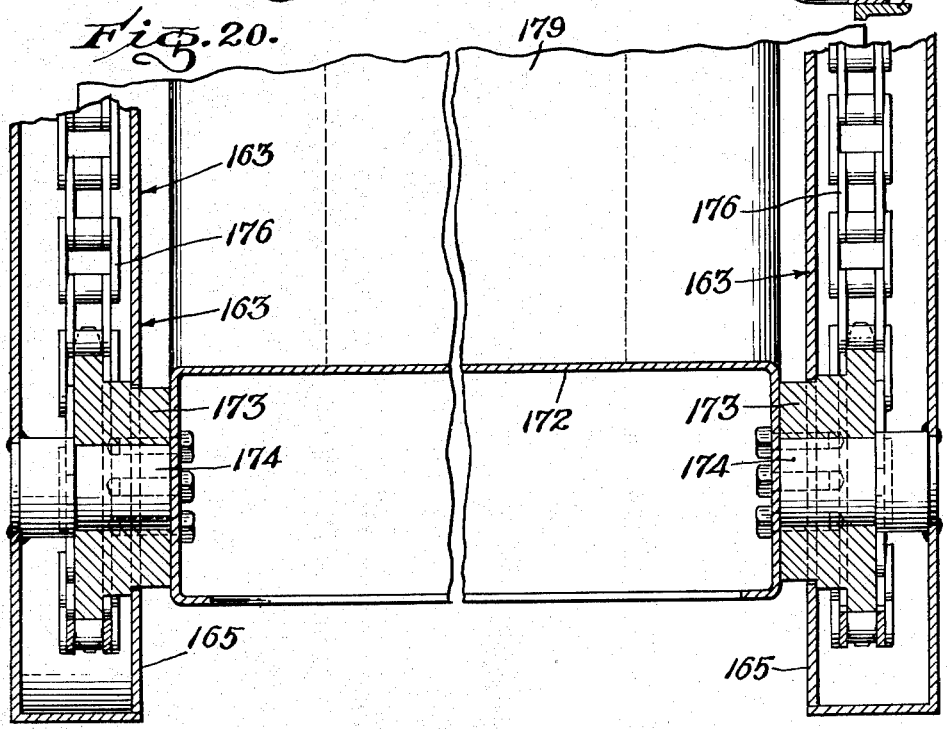

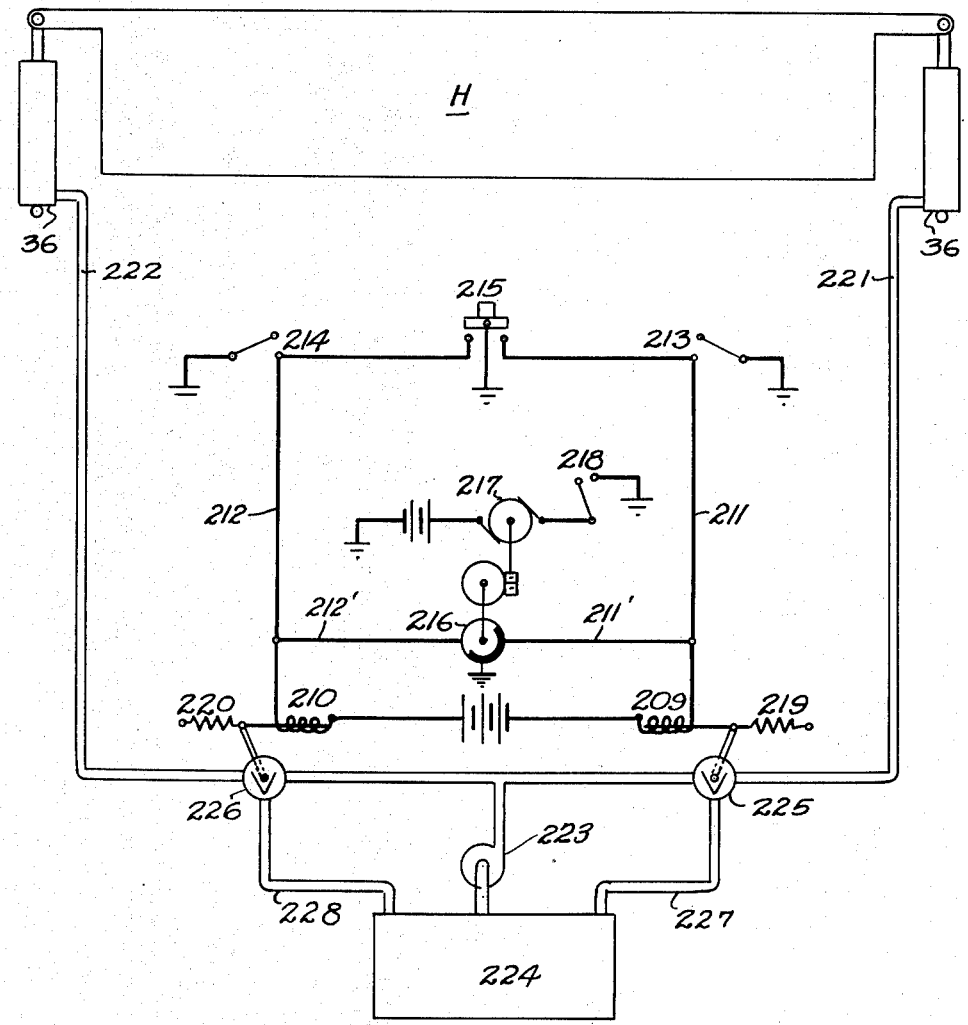

Patented May 18, 1954

2,678,452

UNITED STATES PATENT OFFICE 2,678,452

HOSPITAL BED

Marvel D. Beem and John E. Urbany,
West Los Angeles, Calif.

Application December 12, 1950, Serial No. 200,482

4 Claims. (Cl. 5—64)

This invention relates to mechanized beds of a type particularly useful in hospitals, sanitariums and rest homes, embodying articulated sectional mattress supports, motorized actuating means therefor, and one or more of the following utilities: Flushable toilet, lavatory, trapeze for use by an invalid patient in moving from side to side of the bed, and a combined service tray and control box carrying the controls for the motor which operates the various functional units of the bed.

One of the important objects of the invention is to provide an improved arrangement of two side by side sectional mattress supports, one of which provides a seat for the toilet facility and the other of which provides a normal resting area for the occupant of the bed, the latter support being provided with means for converting it into an ambulatory cart (commonly referred to in hospitals as a "stretcher") which is removable from the bed as a unit and may be utilized in transporting a patient about a hospital or sanitarium, to and from an operating room, etc. In this respect, the invention provides, in the nonmobile mechanism of the bed, means for elevating and lowering the mattress support which comprises the top portion of the stretcher, together with cooperating mechanism in the stretcher unit itself for latching said top portion in an elevated position from which the elevating mechanism of the bed may be withdrawn downwardly so as to leave the stretcher roller supported upon the floor, and ready to be wheeled out of the bed.

The sectional mattress supports contemplated by the invention are each of a type embodying a back rest, a leg rest, and an intermediate thigh rest section, mounted upon a frame and hinged thereto and to each other in such a manner that the several sections can be tilted upwardly to define a reclining seat arrangement of a type common in hospital beds. One of the specific objects of the invention is to provide improved back and knee-lift mechanisms arranged for simultaneous elevation of the sections of both mattress supports while the cart unit is in the bed, the mechanism being such that it does not interfere in any way with the removal of the stretcher unit from the bed and yet is ready to provide for the lifting of the sections of the main mattress support as soon as the cart has been returned into the bed.

Another important object of the invention is to provide in a bed of the type embodying an articulated sectional mattress support as above indicated, an arrangement for bodily elevating and lowering such a mattress support to various selected levels, in combination with head and knee-lift mechanism which is fully operative at all of such levels, for tilting the support sections upwardly. Thus the invention provides for a "high bed" for situations where a patient must be attended to by a nurse or doctor, and, on the other hand, provides for a "low bed" for an ambulatory or partial ambulatory patient requiring little or no attention from a nurse or doctor. Another object is to provide such a "high-low" bed feature in combination with a retractable flushable toilet facility which is fully operable at any selected bed level. A further object is to provide such a high-low bed feature in connection with a retractable lavatory which is likewise fully operative at all bed levels.

A further important object of the invention is to provide, in a bed having generally the aforementioned characteristics, an arrangement in which the elevating mechanism for changing the level of the bed is utilized for the additional function of elevating the top portion of the stretcher to allow the latter to be removed from the bed.

A further object of the invention is to provide, in a bed as outlined above, a "high-low" bed elevating mechanism which is arranged for operation in a manner to bodily tilt the mattress support (without disturbing the positions of the individual sections relative to each other, as determined by the head and knee-lift mechanisms) so as to attain any of the following results: (a) a "Trendelenburg" position in which the foot ends of the mattress supports are elevated above the head ends thereof; (b) a "reverse Trendelenburg" position in which the head ends of the mattress supports are elevated above the foot ends thereof; and (c) a gentle oscillating or rocking movement of the mattress supports about a transverse axis intermediate the head and foot ends thereof, as, for example, by first lifting and lowering the head ends of the supports and then lifting and lowering the foot ends thereof, with a continuation of such alternate lifting and lowering, automatically, for any desired time period.

A further object of the invention is to provide, in a bed having a removable main support, together with elevatable frame means upon which said support normally rests, a relatively simple means for automatically engaging said main rest to hold it against tipping laterally under uneven lateral load distribution (e. g. the weight of a person sitting on the edge of the bed) said means being nevertheless adapted to freely release the main support for ambulatory movement of the cart unit of the bed as outlined above.

A further object is to provide, in a bed having the "high-low" feature referred to above, mechanism for maintaining the lateral axes of the mattress supports at all times horizontal, while permitting longitudinal tilting thereof, whereby a support which is stabilized against lateral tilting, is arranged for elevation of either a head or foot end separately or simultaneously, through the use of only two elevating units, one at the head and the other at the foot of the bed.

A further object is to provide, in a bed as outlined above, an improved retractable toilet unit having an improved articulated waste disposal pipe line adapted to provide for (a) vertical movement of the toilet bowl from a lowered position beneath the bed to a position presented to a raised, operative position presented to an opening in the thigh section of the toilet seat mattress support, fully operative at all levels of high-low elevation of the bed; and (b) horizontal movement of the bowl from its lowered position beneath the bed to a position projected from the side of the bed, for use by an ambulatory patient.

A further object is to provide in a bed as generally outlined above, an improved retractable lavatory installation.

Another object is to provide, in a mechanized bed, an improved arrangement of service tray and a support therefor which allows bodily swinging movement thereof from a position extending over the bed, for use by the patient, to a position swung away from the bed or alongside one side thereof, for use by an attending nurse or physician, or for clearing the space above the bed when use of the tray is not desired; and which also provides for free upward movement of the tray in the event it is engaged by the knees of the patient during knee joint elevation.

Further specific objects will appear in the following specifications, in connection with the appended drawings, in which:

Fig. 1 is a plan view of a bed embodying the invention;

Fig. 2 is a right side view thereof (the right side being determined from the view point of the patient, facing the foot of the bed or lying upon his back);

Fig. 2a is a detail sectional view taken on the line 2a—2a of Fig. 2;

Fig. 2b is an end view of the tray;

Fig. 3 is a plan view of the assembly of base frame and intermediate frame;

Fig. 4 is a left side elevation of the assembly of base frame and intermediate frame;

Fig. 5 is a left side view of the bed, with the side panels removed to disclose the mechanism thereof;

Fig. 6 is a plan view of the bed with the mattresses removed to better disclose the mechanism;

Fig. 7 is a vertical transverse sectional view of the bed taken just inside the foot end thereof as indicated by the line 7—7 of Fig. 5.

Fig. 7a is a detail sectional view of the stretcher latching means;

Fig. 8 is a fragmentary side view of the main mattress support-cart unit;

Fig. 9 is a fragmentary end view thereof, with parts shown in section;

Fig. 10 is a detail side view of the toilet unit, showing several positions of operation thereof in broken lines, and illustrating portions of the toilet seat mechanisms in section;

Fig. 11 is a detail sectional view of a portion of the waste-pipe line, taken on line 11—11 of Fig. 10;

Fig. 12 is a detail sectional view of a portion of the bowl-lift mechanism, taken on the line 12—12 of Fig. 10;

Fig. 13 is a detail plan view of a portion of the bowl-shifting mechanism;

Fig. 14 is a plan view of the retractable toilet seat;

Fig. 15 is a sectional view thereof taken on the line 15—15 of Fig. 14;

Fig. 16 is a transverse sectional view thereof taken on the line 16—16 of Fig. 14;

Fig. 17 is a fragmentary plan view of the lavatory unit;

Fig. 18 is a transverse sectional view of the bed showing details of the lavatory mechanism;

Fig. 19 is a detail sectional view taken on the line 19—19 of Fig. 17;

Fig. 20 is a detail sectional view taken on the line 20—20 of Fig. 18;

Fig. 21 is a detail sectional view of the tray mounting means; and

Fig. 22 is an outline diagram of a control system that may be utilized in the bed.

In the ensuing description of the bed disclosed in the drawings as an illustration of one specific mechanism in which the invention may be embodied, there is presented first a general over-all description of the bed, followed by detailed descriptions of the various units and features of the bed, each designated by an appropriate subheading.

General arrangement

As disclosed in Figs. 1 and 2, the bed of my invention provides two resting areas, namely a main or normal resting area which is designated generally by the reference letter A and the other a toilet area B. Area A is defined by a mattress comprising sections 21, 21', 21'', and area B is defined by a series of mattress sections 22, 22' and 22''. Sections 21, 22 are back rest sections, section 21' is a thigh rest section, section 22' is a toilet seat section and sections 21'' and 22'' are leg rest sections. The bed embodies a fixed frame including a head member 23, a foot member 24, and at the side of the bed beneath area B, a longitudinal connecting frame 25 (Fig. 3). Connecting frame 25 includes outer and inner longitudinal rails, and has, at its respective ends, integral or rigidly connected upright members 20 to which head and foot members 23, 24 are secured. Frame 25 functions both for connecting the head 23 to the foot 24 and also as the base frame structure for the toilet installation and for the intermediate frame elevating means. A base frame structure 26, for the mechanism beneath the main rest area A, projects laterally from longitudinal frame 25, the end members 27 thereof being spaced inwardly from head and foot member 23, 24, to define spaces 28 at the right side of the bed that are open from the floor or other supporting surface, throughout the height of the bed. As illustrated, the toilet area B is located at the left side of the bed and the main rest area A, which occupies a majority of the width of the bed, covers the central and right side areas of the bed. However it is to be understood that this arrangement may if desired be reversed.

Mattresses 21, 21', 21'', 22, 22', 22'' are supported by two mattress supports which, in Fig. 6 are designated generally by the reference letters A' and B'. Support A' for main rest mattress 21, 21', 21'' functions as the top of an ambulatory stretcher C which is disclosed in detail in Figs. 8 and 9. Support A' is mounted upon a top frame of stretcher C, such top frame including longitudinal rails 39, 39' the respective ends of which are connected by transverse end plates 40. End plates 40 are of rectangular form, disposed in vertical planes, and are secured to rails 39 at their upper corners (Fig. 9). Telescopic legs, indicated generally at 41, are attached to the respective ends of end plates 40 at vertically spaced points, as indicated in Fig. 9. Latching means, to be described in detail hereinafter, are provided for latching telescopic legs 41 either in extended or retracted positions. In the retracted positions, legs 41 are suspended from the top frame 39, 40 and the entire stretcher C is carried upwardly and downwardly by an elevatable intermediate frame H (Figs. 3 and 4). The respective legs 41 are provided with casters 31, the spaces 28 providing for unobstructed rolling contact of the casters 31 against the floor surface on which the bed is mounted, with the casters supporting the stretcher C for wheeling movement into and out of the bed. Mattress support B' is attached to and remains a permanent part of the non-mobile bed installation.

Each of the mattress supports A', B' includes a head rest section, a thigh section and a knee section, designated respectively 32a, 33a and 34a in the main support A', and designated respectively 32b, 33b and 34b in the toilet rest unit B'. Head rests 32a, 32b and thigh sections 33a, 33b, are hinged to their respective supporting frames, and thigh sections 33a, 33b are hinged to leg rests 34a, 34b to provide elevatable knee joints, as will be described more in detail hereinafter.

Main rest mattress 21 may, as shown, comprise either a series of individual sections, corresponding in position and area to the support sections 32a, 33a, 34a, or may comprise simply a one piece mattress, which may be of sponge rubber or other material of high flexibility such as to conform to the contour of support A' when the sections thereof are tilted upwardly.

Mounted in the bed beneath toilet seat rest B' is a flushable toilet unit which is designated generally by the reference letter D. Toilet seat section 33b embodies a movable cover 147 (Fig. 14) which is shiftable laterally to uncover an opening 146 therein, through which the bowl of toilet unit D may be elevated. Disposed alongside toilet unit D, at the opposite side of the bed, beneath the central portion of main rest area A, is a lavatory unit, indicated generally at E (Fig. 17) embodying a lavatory bowl and means for projecting the same outwardly from beneath the bed and up along the side of the bed to a position where it may be used by a bed occupant.

Hingedly attached to the toilet side of the bed is a trapeze unit F (Fig. 5) for use by the patient in shifting his body from the main rest area A to the toilet area B and vice versa.

Also attached to the toilet side of the bed is the supporting post of a combined tray and control box unit G. Units F and G are located at the toilet side of the bed so as to avoid interference with the movement of the stretcher C into and out of the open opposite side of the bed.

*Intermediate frame and elevating means*

In operation within the bed, supports A' and B' are both carried by the elevatable intermediate frame H which is supported upon the base frame 25, 26 (Fig. 3) by a pair of elevator units which, in the embodiment shown, take the form of hydraulic servomotors or struts 35, 36 respectively. Struts 35, 36 are located approximately beneath the line of separation between areas A and B, so that the weight of supports A' and B' may be roughly centered over them. The intermediate frame H is disposed beneath the toilet area B and main rest area A and above base frame 26, 25. Support for stretcher C is provided by arms 37' which constitute transverse end members of frame H. Arms 37' are positioned to engage beneath longitudinal rails 39, 39' of the top frame of stretcher C.

Intermediate frame H, in detail, as shown in Fig. 4, includes central upper longitudinal rails 42, 42, joined at their respective ends by the transverse frame members 37; lower longitudinal members 43 adapted, in the lowered position of frame H, to rest against the longitudinal rails of base frame 25, 26; pairs of relatively short longitudinal members 421 and 422, spaced longitudinally from one another at the toilet side of the bed to define therebetween a bowl-receiving space 99; relatively short longitudinal members 423 and 424 at the other side of the bed, spaced longitudinally from one another to define therebetween a lavatory space 160; outer and inner vertical struts 44, 44', 45, 45' 45'', 45a respectively, joining the longitudinal rails 42, 421, 422, 423 and 424 to the lower longitudinal rail members 43, 43' respectively; inner transverse members 371 and 372 joining the inner ends of the pairs of short longitudinal members 421 and 422 respectively; inner transverse members 373 and 374 joining the inner ends of short longitudinal members 423 and 424 to central longitudinal members 42; and suitable additional transverse members (not shown) parallel to end members 37, joining the respective longitudinal rails together at the lower corners thereof. Lower longitudinal rails 43 may have end portions 43' offset upwardly.

The frame H is tilted or rocked about transverse axes in order to produce the "Trendelenburg," "reverse Trendelenburg," and oscillating movements hereinbefore referred to. For example, by actuating servomotor 36, the foot end of frame H may be elevated or tilted upwardly to a "Trendelenburg" position which is shown in broken lines in Fig. 4, the entire frame fulcruming upon the upper end of strut 35 at the head end thereof.

Struts 35, 36 are pivotally attached at 49 to base frame members 27 and their opposite ends are pivoted to brackets 50 secured to and projecting from the respective ends of intermediate frame H.

Frame H is stabilized against lateral tilting movement under unequal lateral distribution of load, by means of stabilizing, knee action linkages at the respective ends thereof. Each of said linkages includes two knee action units, one at each side of frame H, each unit including an upper arm 51, a lower arm 51' pivoted to a respective upper arm 51 by means of a pivot joint 52, and shafts 53, 54, to which the upper and lower ends respectively of upper and lower arms 51, 51' are rigidly secured. Shafts 53, 54 have at their ends trunnions that are journalled in suitable bearing brackets 55, 56 respectively, attached to the upper end corners of frame H, and to base connecting frame 25 in the spaces afforded by upwardly offset frame members 43'. By reason of the rigid connection between arms 51, through shaft 53, and the rigid connection between arms 51', through shaft 54, the arms 51 and 51' must remain at all times in alignment with each other, and consequently, shafts 53 and 54 must remain parallel to each other as a shaft 53 moves upwardly and downwardly. Thus, while either end of frame H may freely move vertically in response to lift applied thereto from servomotors 35, 36, the equalizing linkage 51—54 resists any lateral tipping of the frame in any position of elevation thereof.

Back lift and knee lift mechanism

The sections of toilet seat support B' are mounted directly upon frame H, and connected directly thereto. The sections of main support A', on the other hand, are mounted upon the top frame 39, 39', 40, of stretcher C and receive support from frame H by the resting of longitudinal frame members 39 of cart C upon transverse frame members 37, 37³, 37⁴, and arms 37' of the frame H, longitudinal stretcher frame members 39 projecting sufficiently beyond transverse members 37, 37' at each end of the stretcher so that vertical end frame members 40 and legs 41 of the stretcher may clear said transverse frame members 37, 37', etc., and be received within spaces 28, adjacent head and foot members 23, 24 respectively.

Back rest 32b (Figs. 5 and 6) and toilet seat section 33b are pivoted to longitudinal frame members 42l by hinges 57b. Free swinging end of toilet seat section 33b is connected to leg rest section 34b by a knee hinge 58b. Back rest lift mechanism comprises a hydraulic servo-motor 60, pivoted to a bracket 61 on a lower transverse bar 38 of intermediate frame H, and having a piston rod 62 which is pivoted at 63 to the under side of back rest 32b.

The knee lift mechanism comprises a hydraulic servomotor 65 pivoted to a bracket 66 on the other lower transverse bar 38 of intermediate frame H, and having a piston rod 67 which is pivoted at 68 to toilet seat support section 33b adjacent knee hinge 58b.

The pivotal connections 63 and 68 between piston rods 62, 67 and back rest and seat section 32b, 33b respectively, are established through brackets 69, 69' which are attached to the inner side of support sections 32b, 33b respectively, and project laterally beneath the corresponding support sections 32a, 33a of the main support A', for transmitting lifting movement thereto. Brackets 69, 69' (Fig. 2a) may be attached to transverse reinforcing channels 70b, 73b attached to the under sides of support sections 32b, 33b. Brackets 69, 69' may be arranged to engage beneath similar reinforcing channels 70a, 73a attached to the under sides of support sections 32a, 33a (see Fig. 2). Head rests 32a, 32b may have additional reinforcing members 72a, 72b attached to their undersides near their head ends (Figs. 2 and 5). An additional lift connection between back rests 32b and 32a is provided in the form of an arm 71 rigidly attached to back rest 32b along the upper end thereof and projecting laterally beneath the upper end of back rest 32a (Fig. 6). It will now be apparent that the back and knee lift servomotors 60, 65 are located beneath the adjoining sides of supports A', B' so as to attain maximum efficiency in providing lift simultaneously for both supports. It will also be apparent, since the back rest 32a and knee joint 58a derive their lift simply from the resting of back rest 32a and thigh section 33a against the lifting brackets 69, 69' and arm 71 extending laterally from support B', that the support A' may be freely withdrawn from the bed when the back rest and knee joints are in their lowered positions, and as freely returned to the bed, without any interference from the lift connections between the support sections. In this respect, it may be noted (Fig. 2) that back rest 32a, when directly supported upon frame members 39, is supported through the medium of transverse reinforcing members 70a and 72a, and that knee joint 58a is similarly supported by channel 73a, at sufficient elevation above frame members 39 so that the lifting members 69, 69', 71 may be freely received beneath the back rest 32a and knee joint 58a respectively as the cart is wheeled into the bed.

Leg rest sections 34a and 34b have the foot ends thereof connected to frame H and to the top frame of stretcher C respectively, through the medium of links 75 (Figs. 5 and 8) each having its lower end pivoted at 76 to a respective supporting frame and its upper end pivoted at 77 to the foot end of a respective leg rest section. There are four of the links 75, one at each side of each of the leg rest sections. In the lowered, horizontal positons of supports A', B', links 75 extend substantially horizontally from pivots 76 towards the foot of the bed. Accordingly, pivots 76 are located headward from the normal position of the foot ends of the supports, a distance corresponding approximately to the length of links 75. As the knee joints 58a, 58b are raised, they will swing towards the head of the bed and will correspondingly move pivots 77 headward, causing links 75 to rise and lift the foot ends of leg rests 34a, 34b to elevated positions (partial Trendelenburg) as indicated in Fig. 5.

Stretcher unit

Stretcher unit C (Figs. 2, 8, 9) includes the support sections 32a, 33a, 34a, mounted upon longitudinal top rails 39, 39' as previously described, the end plates 40 connecting the ends of rails 39, 39' and the telescopic legs 41 each of which includes an upper tubular leg section 80 attached to an end of one of the end plates 40, and a lower leg section 81 vertically slidable within upper leg section 80. Each of the lower leg sections 81 has mounted in its upper end a pin 82 which projects laterally through a vertical slot 83 in its corresponding upper leg section 80, whereby the lower leg section is held against rotation while being allowed to slide vertically. Upper leg sections 80 are secured to end flanges 84, of end plates 40 by an upper stud 85 extending through said flange 84 and secured by a nut, and by a lower tubular stud 86 which likewise extends through flange 84 and is secured by a nut threaded thereon. Tubular stud 86 functions as a bearing bushing in which is slidably mounted a latch bolt 87 that is receivable in upper and lower openings 88, 88' in lower leg section 81. A notch 89 in the lower side of bolt 87 is adapted to receive the wall of lower leg section 81 at the bottom of opening 88 in order to latch the bolt 87 against withdrawal, when bolt 87 is thrust downwardly against leg 81, as in the case where the weight of the stretcher is supported upon the casters 31. When, however, the stretcher is lifted by the engagement of intermediate frame H beneath longitudinal rails 39, 39', bolts 87 will move to the top sides of openings 88, and will then be in positions from which they may be retracted to allow leg sections 81 to move upwardly into leg sections 80 when the weight of the stretcher is again placed upon casters 31. It may now be noted that the engagement of latch bolts 87 in openings 88 determines the extended positions of legs 81, locking the legs in their extended positions so that the stretcher, with its top raised, may be wheeled out of the bed.

When the lower leg sections 81 are fully retracted upwardly into upper leg sections 80, latch bolts 87 may engage in lower openings 88', whereupon the stretcher with legs retracted, may be picked up by the intermediate frame H so as to become, in effect, a functional part thereof, with the casters 31 elevated off the floor at all times except when the frame H is in low bed position. In the latter position there is a slight clearance between the top of the stretcher and the intermediate frame H (see Fig. 5) enough to allow stretcher unit C to sink to a position of maximum telescoping of lower leg sections 81 into upper leg sections 80, which, as indicated above, provides for the free movement of latch bolts 87 into openings 88'.

Bolts 87 are actuated by linkage comprising a pair of links 90, each pivotally connected to a respective bolt 87 at its outer end and pivotally connected at its inner end to a respective end of a lever 91 which is pivoted at 92 to the inner side of a respective end plate 40. There are a pair of links 90 and a lever 91 at each end of the stretcher, and each lever 91 is connected by a short link 93 to a crank arm 94 the upper end of which is secured to a shaft 95, extending the full length of the stretcher. The ends of shaft 95 are journalled in suitable bearings in opposed upper corners of respective end plates 40. To one end of shaft 95, which projects beyond the end of stretcher C, is secured an operating handle 96. Downward movement of operating handle 96 rotates shaft 95 to transmit movement to the two crank arms 94, each operating to rotate a respective lever 91 and thereby cause links 90 to retract their respective latch bolts 87.

Secured to shaft 95 and projecting horizontally therefrom is a counterweight 97 which yieldingly urges the linkage in the direction for projecting bolts 87 into openings 88, 88'. Thus the latching is effected automatically.

*Intermediate frame description*

To prevent tipping of the stretcher unit when incorporated in the bed, in the event it is subjected to the weight of a person seated on the "edge of the bed," and to latch the stretcher unit into the bed against accidental lateral movement when casters 31 are resting upon the floor, there is provided a combination of vertical bearing plates 59 (Figs. 2 and 6) against which the inner legs of the stretcher engage, together with a pair of abutment fingers 259 (Figs. 3, 6 and 7a) behind which the inner longitudinal rail 39 of the stretcher is engaged when the stretcher is moved into the bed to a position immediately adjacent toilet rest area B. The upper end of each finger 259 has a camming portion 359 which is inclined upwardly and outwardly (towards the right side of the bed) whereby, as the intermediate frame is moved upwardly into engagement with the top of the stretcher, the camming portions 359 will, if the stretcher is not sufficiently moved into the bed, engage rail 39 and shift the stretcher toward toilet rest area B until rail 39 has engaged behind fingers 259. Fingers 259 are mounted upon transverse members 37 of intermediate frame, as shown in Figs. 3 and 7a. Bearing plates 59 are secured to inner longitudinal member of portion 25 of the base frame and to upright members 20 thereof, and extend to a sufficient height to maintain contact with the stretcher legs throughout the range from low bed to high bed positions.

When rail 39 is hooked behind abutment fingers 259, the inner stretcher legs will bear against bearing plates 59. Any concentration of load at the outer side of the stretcher, which, with castors 31 off the floor, would tend to tilt the outer side of the stretcher downwardly, will be resisted by the cooperative action of abutment fingers 259 and bearing plates 59, preventing the outward tilting of the upper ends of the stretcher legs and the inward tilting of the lower ends that would necessarily have to occur in order for the top of the stretcher to thus tilt downwardly.

*Operation of high-low bed, head and knee lift and stretcher*

The operation of the mechanism thus far described, will be reviewed at this point. Assuming that a patient has just been admitted to a hospital equipped with beds embodying the invention, it will be possible, by removing the stretcher from the bed and wheeling it to the entry, to immediately place the patient upon the stretcher, to wheel the stretcher through the hospital until the patient's room is reached, and to then wheel it into the bed with the casters 31 entering the spaces 28 of the bed. It will be assumed that the top of the stretcher is latched in its raised position in which lower leg sections 81 are extended and latch bolts 87 are latched in openings 88. The engagement of notches 89 with leg sections 81 will prevent any accidental withdrawal of bolts 87 while the stretcher is in the elevated position.

After the stretcher has been wheeled into the bed, it may be lifted slightly by elevating the intermediate frame H until transverse rails 39 are supported upon frame H. Bolts 87 then will engage the upper sides of openings 88, allowing the handle 96 to be actuated to retract the bolts. Thereupon, by lowering the intermediate frame H, lower leg sections 81 will be telescoped into upper leg sections 80. When bolts 87 register with openings 88', the loading of the linkage by weight 97 will become effective to project the bolts into the openings 88' and thereby latch the lower leg sections 81 to the upper leg sections 80 in their retracted positions. Thereafter, when the intermediate frame H is again elevated, the legs will be suspended in their retracted positions, and the stretcher will move with the intermediate frame H, with toilet rest support B' remaining at all times in the plane of main support A'. As the stretcher was moved into the bed, lift transmitting brackets 69, 69' and arm 71 were received beneath channel members 70a, 73a of main rest support sections 32a, 33a, and beneath the upper end of section 32a, the proper spacing of sections 32a and 33a above frame members 39, in order to allow the lift transmitting members to clear the under side thereof, having been provided for by the engagement of reinforcing channels 72a, 73a, 70a against longitudinal rails 39. With the stretcher thus established as a functional part of the bed, the head and knee lift mechanisms may be actuated as desired, transmitting lift directly to the toilet rest sections 32b and 33b, and, through brackets 69, 69' and arm 71, transmitting lift to main rest support sections 32a and 33a.

It is desirable to effect simultaneous lift of sections 32a and 32b on the one hand and of knee joints 58a, 58b on the other hand, since, in preparing to use the toilet utility, it is ordinarily desirable to have the toilet rest unit in a reclining seat position (e. g. as indicated in Fig. 5), and in order that the patient may readily shift from the normal rest area A to the toilet rest area B, both support areas should have corresponding reclining seat conformations.

Since the lift servomotors 60, 65 are anchored at their lower ends to the intermediate frame H, their operation is in no way affected by the raising and lowering of frame H. The lift struts 60, 65 move bodily upwardly and downwardly with the frame H.

High bed position is indicated in broken lines in Fig. 5; low bed position in full lines. Elevation of frame H, while maintaining the same level, to effect change between high and low bed positions, is effected by actuating both of the elevating struts 35, 36 simultaneously and at the same rate.

To provide a "Trendelenburg" position, struts 36 are actuated separately to raise the foot end of intermediate frame H, thus tilting support members A', B' upwardly at the foot ends. To obtain a "reverse Trendelenburg" position, strut 35 is actuated alone. To obtain a "vasoscillating" action for the treatment of vascular ailments, struts 35 and 36 are alternately actuated to raise first the foot end and then the head end and then the foot end, etc., of the intermediate frame H. The invention preferably utilizes control mechanism for causing one end to raise and lower while the other end remains lowered, and to then immediately cause the other end of frame H to raise and lower while the first end remains lowered. Fig. 22 illustrates a simplified diagram of a control arrangement that may be employed. Struts 35, 36 may be supplied with hydraulic liquid through lines 221, 222, pumped by a pump 223, from a reservoir 224, through control valves 225, 226. Each valve may have two operative positions, in one of which it directs flow from pump 223 to a respective line 221 or 222, and in the other of which it allows return from a respective line 221 or 222 to the reservoir 224 through a respective bypass 227 or 228. Solenoids 209, 210 may actuate the respective valves when energized through respective control circuits 211, 212 through the closing of respective individual switches 213, 214 (for reverse Trendelenburg and Trendelenburg positions) or a common switch 215 (for high-low bed positions) valves 209, 210 may be spring urged to their bypass positions. For "Vasocillator" operation, a commutator 216, adapted, when rotated by a motor 217 under the control of a manual switch 218, to close circuits 211, 212 in alternating succession, may be employed. That is to say, commutator 216 may, in the arrangement shown by way of illustration, comprise a grounded contact segment adapted, as it rotates, to alternately close on contact brushes attached to branch conductors 211', 212' connected to respective circuits 211, 212 as shown. Thus, as the commutator rotates, the circuits 211, 212 will be alternately closed and servomotors 35, 36 will be alternately actuated to raise and lower first one end of frame H, then the other, in alternating succession, to produce what is known as a "Vasocillator" movement for vascular therapy.

Toilet mechanism

The toilet mechanism, illustrated in Figs. 5, 6 and 10, includes a toilet bowl 100 which is adapted to be moved in a generally upward direction from a below-the-bed position, shown in full lines in Fig. 10, to a position projecting upwardly through or partially through opening 146 (Fig. 14) in the toilet seat section 33b. Accordingly, the flushing outlet of bowl 100 is at the bottom thereof and is connected to a downwardly extending arm of an elbow 102 which has a rearwardly extending arm rigidly connected to a jet unit 133. Jet unit 133 is rigidly connected to the lower elbow of an S connection 103, which embodies a downwardly extending bearing socket 134. In socket 134 is rotatably mounted a bearing ball 135 which bears against a bottom plate 98 of frame H to provide rolling support for toilet bowl 100, for lateral movement thereof when in its lowered, under-the-bed position. Plate 98 defines the bottom of bowl receiving space 99 in frame H, space 99 being open from bottom plate 98 upwardly through the top of frame H.

S-connection 103 provides an upward offset of the waste disposal line from jet 133 to an elbow 104 which is disposed in a horizontal position at the level of bowl 100. Elbow 104 has a transverse horizontal arm extending outwardly (toward the adjacent side of the bed—see Fig. 13) and is rotatably connected to the horizontal arm of an elbow 105 to provide a swivel joint on a transverse axis which, in the low bed position, is indicated at o and, in the high bed position is indicated at o'. The elevation of the bowl 100 is accomplished by swinging it upwardly about axis o or o' or any intermediate position of this axis. The clearance space provided between bowl 100 and S-connection 103 by the downwardly offset location of the adjoining horizontal arms of elbow 102 and connection 103 makes it possible for the bowl 100 to be projected up through toilet seat 33b to any desired extent without interference between the seat sections 33b and the waste outlet. The upward offset provided by connection 103 makes it possible to swing the bowl from a pivot axis substantially level with the bowl, so that the direction of upward movement may closely approach the vertical. Actually, the axis o is located so as to be substantially in the plane of toilet seat section 33b when the latter is tilted upwardly to a position approximately midway between its lowered, horizontal position and its position of maximum elevation. Thus it is possible for the bowl to move through the opening in toilet seat section 33b in any position of seat section 33b between these two extremes. Also, in the position of seat section 33b shown in Fig. 10, which may be considered to be a normal position of elevation for use of the toilet in most cases, the plane of the upper face of bowl 100, which functions as a toilet seat, may be disposed practically parallel to the plane of seat section 33b, for maximum support and comfort of the patient.

Elbow 105 has a downwardly extending arm which is joined, by a rotatable connection on a vertical axis, to an upwardly extending arm of an elbow 106. This vertical axis is indicated at p in Fig. 6, and the joint is located directly adjacent the outer side of frame H. Axis p is fixed by the attachment of elbow 106 to outer vertical strut member 45a, as by bolting or welding elbow 106 to the web and the side flanges of strut 45a. It will now be apparent that, with proper vertical support for bowl 100 to prevent it dropping downwardly, it may be freely swung laterally about axis p, moving out through the open side of space 99 to a position projected laterally from beneath the bed as indicated in broken lines in Fig. 6. Since elbows 104, 105 provide an inward offsetting of the longitudinal axis of bowl 100 and waste line 102, 103 from axis p, it will be possible for this waste line and bowl assembly to swing outwardly to a considerable angle without interference between connection 103 or elbow 104 and the outer vertical strut 45'.

It will also be apparent that, with elbow 104 restrained against rotating around axis p, horizontal axis o will be fixed in a position at right angles to the side of the bed, with bowl 100 positioned below and in register with the opening in seat section 33b, whereby as the bowl is elevated around axis o it will clear the sides of seat section 33b.

Adjacent the bottom of frame H elbow 106 has a horizontal arm projecting inwardly (toward the center of the bed) and joined through a rotatable connection to an outwardly extending horizontal arm of an elbow 107. The rotatable connection just referred to is disposed on a transverse horizontal axis which is indicated at q in Fig. 10. Axis q is permanently fixed with reference to frame H. Elbow 107 has an arm, disposed in the vertical plane of elbows 102, 103 and joined to a floating section of waste pipe 108 which is inclined upwardly and rearwardly and connected at its upper end to an elbow 109. Elbow 109 has a horizontal arm extending outwardly and joined by a rotatable connection to an inwardly extending horizontal arm of an elbow 110, to provide a swivel joint on a horizontal transverse axis which is indicated at r. Elbow 110 has a downwardly extending arm which is fixed to an upwardly extending arm of an elbow 111. Functionally, elbows 110 and 111 may constitute integral portion of a C-connection which provides a tube section extending downwardly from axis r to a transverse horizontal axis s disposed below axis r near the floor level. Axis s constitutes the axis of a swivel joint connection between an inwardly extending arm of elbow 111 and an outwardly extending arm of an elbow 112 which has an arm extending rearwardly in substantial alignment with the axis of the horizontal arm of elbow 102, and is joined to a tube section 103 leading to a sewer connection (Fig. 6).

Tube 113 and elbow 112 are rigidly connected to the fixed frame structure of the bed, as by a connection between elbow 112 and transverse base frame member 114 and a connection between tube 113 and head member 23.

It may now be noted that axis r may swing horizontally about axis s, lengthwise of the bed, in order to accommodate vertical movement of axis q in the elevation and lowering of the bed between low bed and high bed positions. For example, as frame H is raised from low bed position shown in full lines in Fig. 10 to the high bed position shown in broken lines, elevation of axis q in a fixed vertical path will require waste pipe section 108 to assume a more horizontal position and will therefore cause axis r to swing toward the head of the bed, the C-connection comprised in elbows 110, 111 swinging bodily headward about axis s. In the elevated position shown in broken lines in Fig. 10, tube section 108 has obtained a fully horizontal position, and axis o has risen to a position at o'. The position of axis o relative to intermediate frame H has, however, remained fixed. The elevated position of the bowl in the high bed position is indicated at 100''. The lowered position of the bowl in the high bed position is indicated at 100'. The relative position of bowl 100, seat section 33b, back rest mattress section 22 and leg rest mattress section 22'' are all indicated in the uppermost broken line showing in Fig. 10.

The mechanism for moving the bowl (Figs. 10–13) comprises a pair of hydraulic servomotors, one for elevation and the other for lateral movement, so arranged that neither will interfere with the operation of the other. Full elevation is effected by a servomotor 120, inclined downwardly and footwardly from a pivotal connection to one of the brackets 50, and pivotally connected at 121 to a crank arm 122 of a bell crank lever which is pivoted, at axis o, on a bracket 123. Bracket 123 is attached to a vertical strut 45' of intermediate frame H, and has an arm 124 extending footward beneath an abutment finger 125 that is rigidly attached to the flange of elbow 104 and projects horizontally therefrom towards the center of the bed (see Fig. 12). Normally, with bearing 135 resting against bottom plate 98, arm 124 will be sufficiently out of contact with abutment finger 125 so that bowl 100 may be swung laterally about axis p, with bearing 135 rolling against bottom plate 98. In the laterally projected position shown in broken lines in Fig. 6, bearing 135 maintains supporting contact with bottom plate 98.

Lateral movement of bowl 100 is effected by the hydraulic servomotor 127 (Fig. 6), one end of which is pivotally connected to a bracket 128 secured to an intermediate upright strut 44' of frame H. The other end of strut 127 is pivotally connected, at 129, to an arm 130 (Fig. 13) which is secured to elbow 105 and extends transversely inwardly so as to constitute, with the transverse arm of elbow 105, a crank arm of sufficient length to effect the lateral swinging of bowl 100 when servomotor 127, acting in a direction generally longitudinal of the bed, is extended.

It will now be clear that servomotors 120 and 127, each anchored at one end to the intermediate frame and at its other end connected to a respective swivelling elbow of the waste pipe line, are fully operative in high or low bed positions or any intermediate positions, remaining unaffected by raising and lowering of the intermediate frame, which is taken care of by the tilting movement of C-section 110, 111 and its pivotal connections to floating section 108 and fixed outlet pipe 113 respectively.

Vertical offset 103 rises to a height such that the normal water level in bowl 100, in its lowered position, will be at the bottom of the passage in horizontal arm of elbow 104, with a water trap being maintained in elbows 102 and offset 103. Furthermore, the offset 103 is sufficiently close to axis o of vertical swinging movement of bowl 100 and the angle defined by the lower elbow of offset 103 is sufficiently sharp so that in the position of maximum upward inclination of bowl 100, elevated into the bed, a water trap of sufficient depth to meet standard plumbing code requirements, will be maintained in this lower elbow of offset 103 and in the connecting portion of elbow 102. This trap level is indicated by the dotted lines 434 in the high bed, elevated position 100'' of the toilet bowl Fig. 10. This water trap is important for the reason that in the high bed position, a secondary trap which is normally established in the vertical column provided by elbows 105 and 106 and in the upwardly inclined floating tube section 108, is lost due to the fact that floating tube 108 reaches a horizontal position in the high bed, as previously noted.

Because the water seal in tube sections 105, 106, 108 is lost in the high bed position, a vapor lock in the sections is developed when the bed is returned to the low bed position. This vapor lock is overcome by the action of jet 133 which propels a sufficiently powerful stream of flushing water into the vapor locked area to sweep out the trapped air and gases and to reestablish a water column in the secondary trap. The flushing jet 133 may be as shown in the formerly copending application Serial No. 96,292, filed May 31, 1949, of John Urbany and Marvel Beem, now abandoned.

*Retractable cover for toilet seat section*

Figs. 6, 14, 15 and 16 illustrate the retractable toilet cover mechanism, together with details of toilet seat section 33b. The frame portion of section 33b comprises simply a pair of bars 140 disposed in closely spaced parallel relation adjacent the outer side of support B', and a short arm 141 disposed adjacent the inner side of support B', bars 140 and arm 141 being attached to a hinge tube 142 the ends of which are journalled upon trunnions 143 mounted in hinge brackets 57b, to provide the hinge connecting seat sections 33b to frame H. Attached to and offset laterally from arm 141, through the medium of a bracket 144, is a bar 145 which, together with the inner bar 140, defines the sides of the toilet bowl receiving opening 146 in seat section 33b.

A shiftable cover member 147 is mounted upon a pair of channel iron battens 148 which are secured thereto at the respective sides thereof and project downwardly therefrom. In battens 148 are secured the ends of a pair of slide rods 149 which are slidably mounted in bearing bushings 150 secured between the bars 140. A pair of supplementary slide rods 151, the outer ends of which are secured to the rear extremity of the outer beam 148, are slidably telescoped in sleeves 152, the inner ends of which are secured to bracket 144. Immediately below bearing sleeves 152 is a hydraulic servomotor 155, which is anchored to bracket 144 and has a piston rod 156 the end of which is anchored to the outer batten 148 of the slidable cover 147. By operating servomotor 155, cover 147 may be moved to the extended position shown in full lines in Fig. 14, in which opening 146 is uncovered sufficiently to permit the bowl 100 to be projected upwardly therethrough, and, by reverse operation, may be actuated to draw the cover 147 back to the position indicated by dotted lines in Fig. 14. In this position, it will be noted that the inner side of cover 147 is spaced from bar 145. This space is sufficiently wide to avoid any danger of injury to the hand or wrist of a patient in the event it should be extended downwardly into the opening at the time that the cover is closed.

Cover 147 supports mattress section 22', which moves with the cover when the toilet mechanism is made operative.

One of the advantages of this improved toilet covering mechanism is the ease with which the cover may be moved to the open position without disturbing the bed clothing above the cover. It is possible to move the cover to the open position while the bed clothing lies upon the mattress section 22', the latter simply sliding out from under the covering without pulling it. For the return movement, the bed covering may be laid back or may be supported by the thighs of the patient who may, by rising slightly from the seat, actuate the cover 147 back to the closed position while still in position over the toilet opening.

*Lavatory mechanism*

Retractable lavatory mechanism of the present invention is disclosed in Figs. 17, 18, 19 and 20.

Referring first to Figs. 3 and 4, intermediate frame H has, in the side thereof opposite the toilet space 99, a lavatory space 160 which is open at that side of the frame. Upon stub shafts 161 which project into the space 160 at the upper extremity thereof adjacent the outer side of the frame, is mounted the lavatory mechanism. Shafts 161 are mounted in brackets 162 which are secured to the outer, upper longitudinal frame members 423, 424 extending between transverse members 37, 373.

The lavatory mechanism includes a pair of hollow, L-shaped arms 163 each including a short arm 164 and a long arm 165. To short arms 164 (Fig. 19) are secured a pair of sprockets 167 which are journalled upon shafts 161.

Near the center of frame H, in bearings carried by upright struts 45a, is journalled a shaft 168. An arm 169 is secured to and projects forwardly from shaft 168. A hydraulic servomotor 170 has one end pivotally connected to arm 169 and its other end pivoted to frame H. A pair of drive chains 211 connect sprockets 171, secured to shaft 168, to sprockets 167. In the retracted position of servomotor 170, shown in full lines, arms 165 will extend downwardly. In the extended position of servomotor 170, shown in broken lines in Fig. 18, sprockets 167, with arms 163 secured thereto, will have rotated 180°, with arms 164 projecting outwardly and arms 165 projecting upwardly as indicated in broken lines.

Supported between the free ends of arms 165 is a lavoratory base 172 to the ends of which are secured a pair of sprockets 173. Sprockets 173 are journalled on trunnions 174, the outer ends of which are fixed to arms 165. Secured to the ends of studs 161, within the end extremities of arms 164, are sprockets 175. Sprockets 173, which are similarly disposed within hollow arms 165, lie in common planes with sprockets 175, and are connected thereto by chains 176 which extend through the length of arms 164, 165 and, at the bends thereof, are trained around idler sprockets 177, 178. Chains 176 function to restrain sprockets 173 and lavatory base 172 against rotation, whereby lavatory base 172 is constantly supported in a horizontal position, projecting outwardly from arms 165. A lavatory bowl 179 is mounted upon base 172, and is provided with conventional faucets 280 and flexible hose connection 281 to a water supply. Hose connections 281, together with a flexible hose waste outlet tube 282 leading from the bottom of lavatory bowl 179, are carried into and out of the bed as the bowl is shifted between the stored position shown in full lines in Fig. 18, to the fully extended position shown in dotted lines in that figure, in which the bowl extends upwardly along the side of the bed and sufficiently above the level of the top of the bed to be handy for use by a patient. It will be apparent that as the bowl is shifted between these positions, it will at all times remain in an upright position because of the connection between sprockets 175, 173, through chains 176.

*Trapeze unit*

The trapeze unit, disclosed in Figs. 5 and 7 comprises a cantilever construction including an arm 180 disposed at the toilet side of the bed, mounted at its lower end on a shaft 181 which extends the width of toilet area B and is journalled in frame H, in bearings brackets 57b. Rigidly attached to the upper end of arm 180 is a horizontal bar 182 which normally lies above the head member 23. Bar 182 is supported solely by its cantilever connection at one end to cantilever arm 180. A reading lamp 183 may be carried by a bracket 184 adjustably mounted in the upper end of arm 180.

Trapeze F is actuated between the retracted position shown in full lines in Fig. 5 and the extended position shown in broken lines, by a hydraulic servomotor 186 pivotally connected at 186' to longitudinal member 43 of frame H, and pivotally connected at its other end to the lower end of an arm 187 which is secured to shaft 181 and projects downwardly therefrom. Extension of servomotor 186, moving arm 187 headward, causes the trapeze F to rise to the operative position shown in broken lines.

Service tray and control box

Secured to outer brackets 143 and projecting upwardly (Figs. 5 and 21) is a sleeve 190 in which is journalled the lower end of a shaft 191 the upper end of which is in the form of an elbow 192 which carries a knuckle joint 193. Knuckle joint 193, which comprises a pair of vertical pivots, connected together by links 194, provides support for a horizontally projecting shaft 195 on which is journalled a worm gear 196. Secured to worm gear 196 and journalled upon shaft 195 is a service tray 197. A manually operable worm 198, meshing with worm wheel 196, may be utilized for tilting service tray 197 about the axis of shaft 195. Hand wheel 199, on the shaft worm 198, may be utilized for actuating the worm.

Service tray 197 is in the form of a shallow box having cover panels 200, 201 hinged thereto at 202, 203 respectively. It is preferably divided into a service compartment, covered by panel 200, in which electrical controls are located, and a utility compartment, covered by panel 201, for storage of patient's utility articles. Panel 201 may have a mirror 204 on the under side thereof, and may be tilted up to an upstanding position where the mirror may be used.

Shaft 191 has enlarged lower end 206 (Fig. 21) which engages the inner wall of sleeve 190 for providing a rotatable bearing such that tray 197 may be swung horizontally about the vertical axis of sleeve 190. Enlarged portion 206 is in the form of a downwardly opening socket, in which is received a coil spring 208, under compression between the upper extremity thereof and the bottom of fitting 143. Spring 208 functions to balance a majority of the weight of the service tray, loading the shaft 192 sufficiently so that in the event the knees of a patient contact the under side of the service tray when the knee joint of the bed is being elevated, the service tray will be elevated under very light pressure, insufficient to injure or cause inconvenience to the patient.

We claim:

1. In a bed, a fixed bed frame; a stretcher including longitudinal frame members and legs for supporting the same on a floor surface; an elevatable intermediate frame having transverse members whereby said stretcher may be carried by said intermediate frame in various positions of elevation; elevating means connected to said fixed frame and operable for elevating said intermediate frame; said intermediate frame having hook means projecting upwardly therefrom and arranged to engage the inner side of the inner one of said longitudinal frame members when the stretcher is in position within the bed; said fixed frame including bearing plates disposed in a common vertical plane extending longitudinally of the bed in positions to be engaged by the inner legs of the stretcher and to cooperate with said hook means in resisting lateral tipping of the stretcher under a load concentrated at the outer side thereof.

2. In a bed, a fixed frame including a head, a foot and a longitudinal frame connecting the same and disposed at one side of the bed; a stretcher normally constituting the other side of the bed, including a pair of longitudinal frame rails, legs for supporting the same on a floor surface when out of the bed; and an articulated mattress support mounted upon said rails; an elevatable intermediate frame; elevating means interposed between said fixed and intermediate frames and operable to elevate the latter; an auxiliary articulated mattress support carried by said intermediate frame; said articulated mattress supports each including head rest and seat sections hinged to their respective supporting frames, a leg rest section and a knee joint hingedly connecting said leg rest section to said seat section; and a pair of lift units connected respectively to the back rest section and the knee joint of said auxiliary mattress support and each connected to said intermediate frame, for raising the sections of said auxiliary support, said auxiliary support sections having means rigidly attached thereto and projecting laterally therefrom at the side adjacent the stretcher, engageable beneath corresponding sections of the stretcher mattress support for raising the same in unison with the raising of the auxiliary support sections, and freely separable therefrom when the stretcher is removed from the bed.

3. A bed as defined in claim 2, wherein the sections of the stretcher mattress support are provided on their undersides with projecting means to engage said rails and support said sections in lowered positions in which they are separated from said rails by clearance spaces and wherein said laterally projecting means include an arm projecting from the head end of the auxiliary head rest section and receivable in one of said clearance spaces.

4. In a bed, a stretcher having extensible legs, rollers on said legs for supporting the stretcher for travelling on a floor surface, and means for latching said legs in extended condition in which said cart may be supported by said rollers in an elevated position; a fixed bed frame including head and foot members and longitudinal frame means connecting said members at one side of the bed only; an intermediate frame disposed between said head and foot members with its respective ends spaced from said members to provide spaces which, on the other side of the bed, will receive said stretcher legs with said rollers travelling on said floor surface; and elevating means attached to said longitudinal frame means and operable to elevate said intermediate frame so as to raise said stretcher to said elevated position in which it may be rolled laterally from between said head and foot members after said intermediate frame has been returned to a lowered position, leaving said stretcher supported in said elevated position by said legs; said stretcher including longitudinal frame members; said intermediate frame including hook means projecting upwardly therefrom and arranged to engage the inner side of the inner one of said longitudinal frame members when the stretcher is in position within the bed; and said fixed frame including bearing plates disposed in a common vertical plane extending longitudinally of the bed in positions to be engaged by the inner legs of the stretcher and to cooperate with said hook means in resisting lateral tipping of the stretcher under a load concentrated at the outer side thereof.

References Cited in the file of this patent

UNITED STATES PATENTS

| Number | Name | Date |
|---|---|---|
| 29,038 | Keene | July 3, 1860 |
| 301,477 | Burley | July 8, 1884 |
| 573,909 | Norton | Dec. 29, 1896 |
| 804,784 | Von Eschen et al. | Nov. 14, 1905 |
| 824,057 | Armstrong et al. | June 19, 1906 |
| 920,922 | Csuthy | May 11, 1909 |
| 1,658,736 | Ortmeier | Feb. 7, 1928 |
| 1,679,635 | Steinberg et al. | Aug. 7, 1928 |
| 1,829,274 | Gilroy | Oct. 27, 1931 |
| 2,014,244 | Bramlett | Sept. 10, 1935 |
| 2,374,488 | Knox | Apr. 24, 1945 |
| 2,407,892 | Mehr | Sept. 17, 1946 |
| 2,500,741 | Taylor | Mar. 14, 1950 |
| 2,532,706 | Freund | Dec. 5, 1950 |
| 2,543,296 | Meredith | Feb. 27, 1951 |